US006411054B1

(12) United States Patent
Van Wiemeersch

(10) Patent No.: US 6,411,054 B1
(45) Date of Patent: Jun. 25, 2002

(54) OBSTRUCTION DETECTION SYSTEM FOR POWER LIFTGATE

(75) Inventor: John Robert Van Wiemeersch, Novi, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/681,062

(22) Filed: Dec. 15, 2000

(51) Int. Cl.[7] ................................................ G05B 5/00

(52) U.S. Cl. ...................... 318/445; 318/283; 318/266; 318/466; 318/446

(58) Field of Search ................................ 318/283, 266, 318/466, 445, 446

(56) References Cited

U.S. PATENT DOCUMENTS

| | | | | |
|---|---|---|---|---|
| 4,240,152 A | | 12/1980 | Duncan et al. | |
| 4,602,256 A | | 7/1986 | Kago et al. | |
| 5,563,483 A | | 10/1996 | Kowall et al. | |
| 5,992,720 A | * | 11/1999 | Miller | 224/509 |
| 6,091,162 A | | 7/2000 | Williams, Jr. et al. | |

* cited by examiner

*Primary Examiner*—Karen Masih
(74) *Attorney, Agent, or Firm*—Gary A. Smith

(57) ABSTRACT

A powered liftgate actuation system for a vehicle in which opening and/or closing of the liftgate is inhibited if the vehicle is positioned too close to an obstruction for unobstructed movement of the liftgate. Non-contact ranging sensors are mounted to the vehicle and directed rearward to detect a clearance distance between the vehicle and an obstruction, and a control circuit for the motor inhibits actuation of the motor by a remote control unit if the ranging sensors indicates the clearance distance is less than the distance by which the liftgate extends beyond the rear of the vehicle. The control circuit has an override feature allowing the remote control unit to be used to actuate the motor and open the liftgate in spite of the ranging sensor indicating the clearance distance is too small. The ranging sensors may also serve as a component of a backup aid warning system used to detect obstructions located behind the vehicle while the vehicle transmission is in a reverse gear position.

21 Claims, 3 Drawing Sheets

OBSTRUCTION DETECTION SYSTEM FOR POWER LIFTGATE

BACKGROUND OF INVENTION

The present invention relates to automotive vehicles having an upwardly opening liftgate for providing access to the rear of the vehicle, and more particularly to a vehicle having a power-driven mechanism for opening the liftgate.

Automotive vehicles such as minivans, sport utility vehicles, or station wagons often-have a rear door attached to the vehicle by a hinge extending horizontally along the upper edge of the gate so that it has a generally vertical closed position and swings upwardly to a generally horizontal open position. Such closures are generally known as liftgates. It is known to provide a liftgate with a motorized actuation system to move the liftgate between the closed and open positions. The motorized system can be actuated by a button or switch within the passenger compartment of the vehicle and/or by a remote control unit carried by a person. Such remote control units are well known within the automotive arts, and are widely used for locking and unlocking vehicle doors.

It is known to provide an electrical control circuit for such a motorized actuator system with a safety feature that stops movement of the liftgate if it encounters an obstruction while opening or closing. U.S. Pat. No. 5,563,483 teaches a system wherein the control circuit utilizes a microprocessor, and a potentiometer is coupled to the drive motor to provide feedback to the microprocessor and causes the motor to be stopped or reversed when the motor encounters a certain degree of resistance to its movement.

While such a system may serve to prevent severe damage to the vehicle and/or the obstruction, even the amount of contact required to stop the motor may result in scratched paint and/or metal on the liftgate if it meets an obstruction. while opening or closing. Because the liftgate may overhang the rear of the vehicle by a distance of several feet when in the open position, it is not unlikely that the vehicle may be parked so closely to another vehicle, a wall, a fence, or some other obstruction that the liftgate would strike the obstruction if it were opened. The remote control opening feature of a power liftgate compounds this problem since it is possible for the person operating the remote to trigger opening of the liftgate from a position where he/she cannot adequately view the rear of the vehicle and/or its surroundings to make an informed assessment as to whether or not there is room for the liftgate to swing to the raised and open position.

It is known to provide an automotive vehicle with a reverse sensing system to alert the driver to certain objects close to the rear of the vehicle when backing up. The Ford Windstar is available with a system comprising four ranging sensors located across the rear bumper of the vehicle which transmit ultrasonic waves when the vehicle's transmission is in reverse. The system provides an audible warning inside the vehicle when the ranging sensors detect an object within approximately six feet or less of the rear of the bumper.

SUMMARY OF INVENTION

It is an object of this invention to provide a liftgate actuation system in which opening and/or closing of the liftgate is inhibited if the vehicle is positioned too close to an obstruction for unobstructed movement of the liftgate.

According to one aspect of the invention, a powered liftgate actuation system is provided comprising a motor actuatable to move the liftgate between closed and open positions, a remote control unit operable to actuate the motor, at least one non-contact ranging sensor mounted to the vehicle and directed rearward to detect a clearance distance between the vehicle and an obstruction, and a control circuit for the motor operable to inhibit actuation of the motor by a remote control unit if the ranging sensor indicates the clearance distance is less than the distance by which the liftgate extends beyond the rear of the vehicle.

According to another feature of the invention, the control circuit has an override feature allowing the remote control unit to be used to actuate the motor and open or close the liftgate in spite of the ranging sensor indicating the clearance distance is too small. The override feature may be achieved by requiring that the a button on the remote control unit be held in a depressed condition for a certain length of time. Alternatively, a second actuation of the button may be required to override the inhibit feature.

According to another feature of the invention, the ranging sensor is also used as a component of a backup aid warning system used to detect obstructions located behind the vehicle while the vehicle transmission is in a reverse gear position.

DETAILED DESCRIPTION

Figure 1:
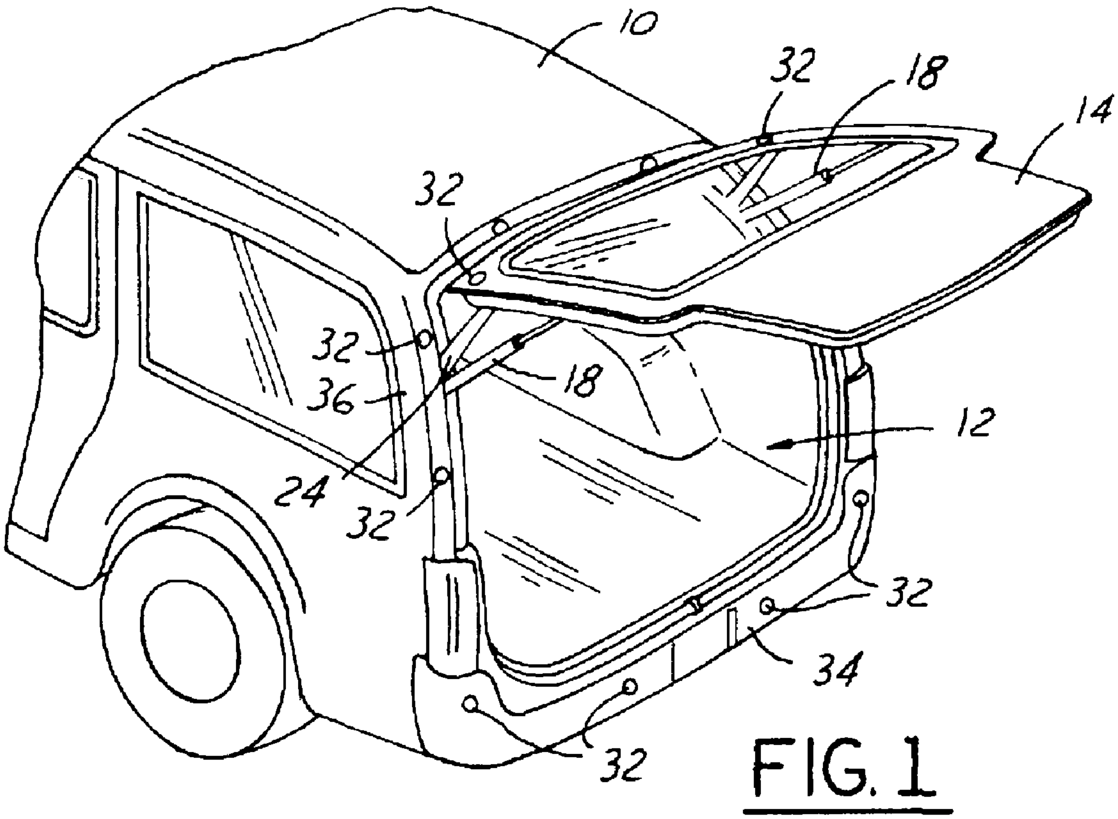
FIG. 1 is a perspective view of the rear portion of a vehicle with a liftgate in an open position.
Figure 2:
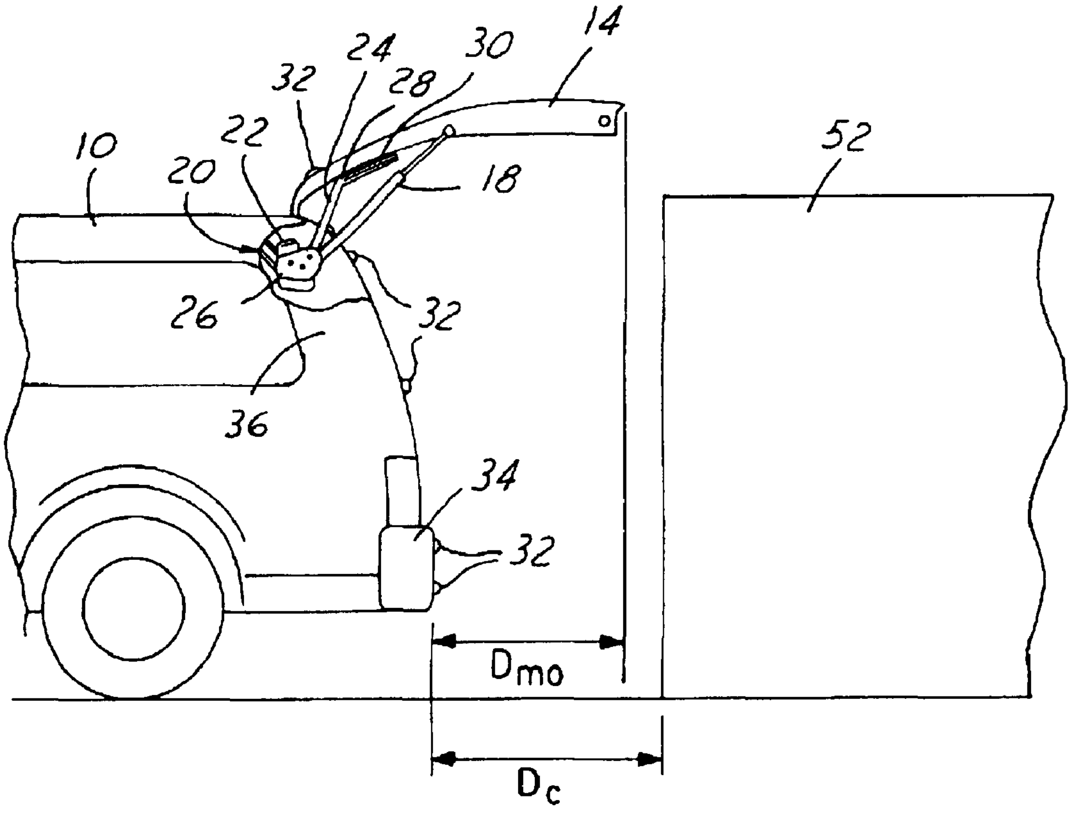
FIG. 2 is a side view of the vehicle rear portion adjacent an obstruction.

As seen in FIGS. 1 and 2, an automotive vehicle has a body 10 with a rear opening 12 closed by a liftgate 14 in a conventionally known manner. The liftgate 14 is moveable between the generally horizontal open position depicted in FIGS. 1 and 2, and a generally vertical closed position (not shown). Damper struts 18 extend between the vehicle body 10 and the liftgate 14, and a powered actuator mechanism 20 is provided to move the liftgate 14 between the closed and opened positions. The actuator mechanism 20 preferably includes a reversible DC motor 22 that operates a crank arm 24 through a gear reduction drive unit 26. A roller 28 at the distal end of the crank arm 24 is retained in a guide channel 30 mounted on the inner side of the liftgate 14 such that the liftgate is moved between the closed and open positions by the roller 28 rolling in the guide channel 30 as the crank arm 24 undergoes pivotal movement by operation of the motor 22. A powered actuator mechanism of this type is disclosed in U.S. Pat. No. 5,563,483, the disclosure of which is incorporated herein by reference. The details of the powered actuator mechanism are described only as an example, and are not intended to constitute limitations on the present invention, as many other actuator mechanisms are possible.

One or more non-contact ranging sensors 32 are mounted on the rear of the vehicle body 10 and are directed generally rearward. The ranging sensors 32 are preferably ultrasonic sonar devices, but may be any appropriate ranging device such as infrared, radar, or laser. The ranging sensors 32 may be located on the rear bumper 34, on the pillars 36 flanking the rear opening 12, on the liftgate 14, or any combination of these positions.

Figure 3:
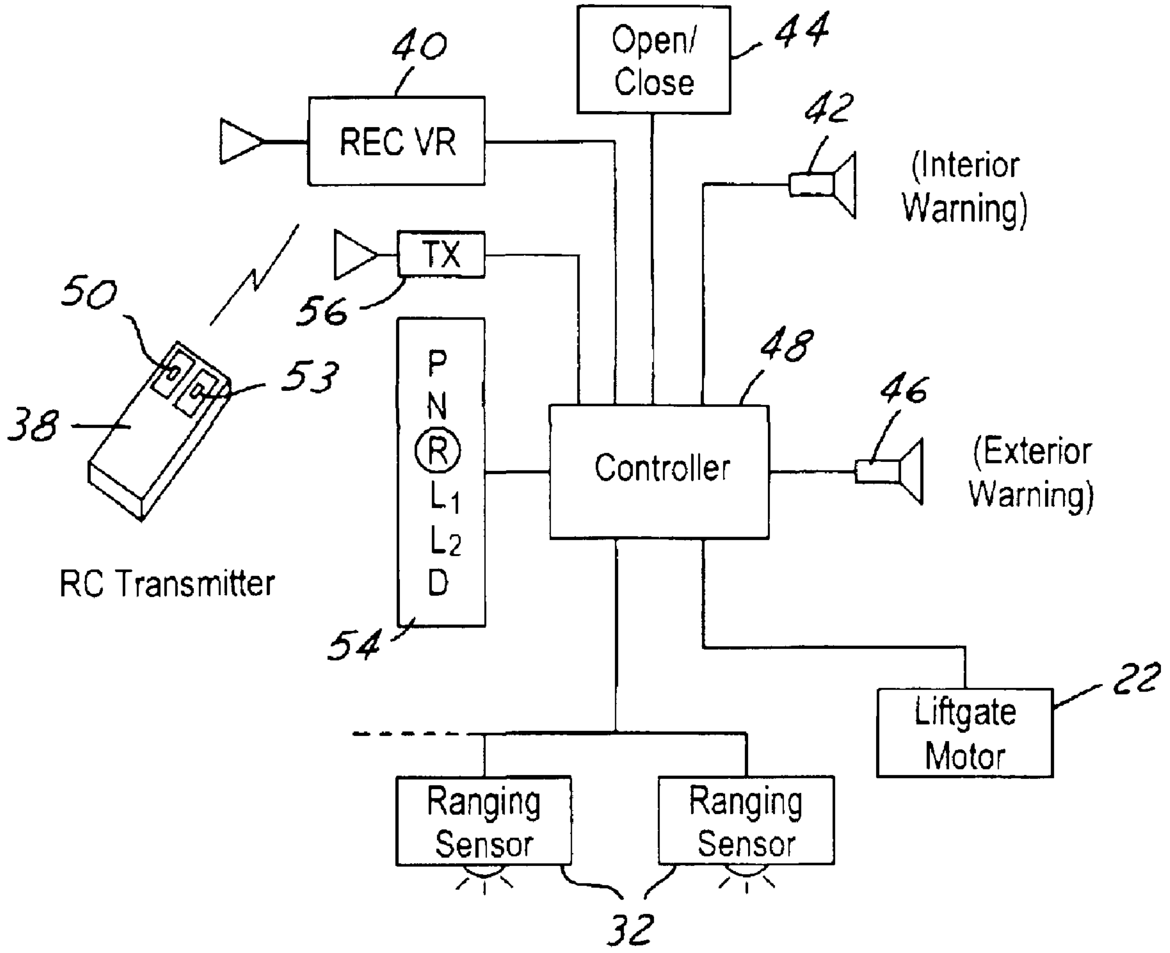
FIG. 3 is a schematic diagram of the liftgate actuation system according to the invention.

As indicated schematically in FIG. 3, the invention system further comprises a remote control transmitter unit 38 to be carried by the vehicle operator (not shown), a receiver 40 for receiving the signal emitted by the transmitter unit 38, an interior warning device 42, an interior liftgate actuation switch 44, an exterior warning device 46, and a controller 48 that controls the overall functioning of the system. Controller 48 is preferably a microprocessor-based device programmed as necessary to achieve operating modes to be described below.

The remote control transmitter unit 38 may operate by radio frequency (RF) or infrared (IR), but RF is preferred since it is less susceptible to line-of-sight limitations. The transmitter unit 38 may also be used to lock/unlock the doors, operate a powered sliding side door of a van, and/or activate a vehicle alarm system, all of these functions being well known in the art.

When the remote control operator depresses a button 50 on the transmitter unit 38, it emits a signal that is received by the receiver 40 and interpreted by the controller 48 as an instruction to unlatch the liftgate 14 and energize the liftgate motor 22 to open or close the liftgate 14. In accordance with the present invention, prior to energizing the liftgate motor 22, the controller 48 energizes one or more of the ranging sensors 32 to transmit ultrasonic signals, receive the signals reflected back from an obstruction 52 behind the vehicle (see FIG. 2), and determine the range to the obstruction. Only if the ranging sensors 32 detect that the clearance distance (indicated as $D_C$ in FIG. 2) to the obstruction 52 is greater than the overhang distance ($D_O$ in FIG. 2) of the liftgate 14 beyond the rear of the vehicle will the liftgate motor 22 be energized to open the liftgate 14. If $D_C$ as measured by the ranging sensors 32 is less than $D_O$, the controller 48 inhibits opening 12 of the liftgate 14 and triggers a warning signal to alert the operator to the fact that the liftgate 14 is likely to strike the obstruction 52 if it is opened. The warning signal may be a sounding of the exterior warning device 46, such as a vehicle horn, or an audible warning produced by the transmitter unit 38. If the transmitter 38 is to produce the warning, it must incorporate a receiver function to receive a signal from a transmitter 56 connected to the controller 48. If it is a person located behind the vehicle that constitutes the obstruction being detected by the ranging sensors 32, the warning signal preferably also serves to alert that person to the fact that the liftgate 14 may soon begin to move.

In one possible embodiment of the invention, the motor actuation may be inhibited by reducing the range at which the transmitter unit 38 is effective to actuate the motor 22 to, for example, approximately 10 feet or less. This ensures that the liftgate 14 can only be opened if the operator is close enough to the vehicle to observe the rear of the vehicle and so confirm that the liftgate 14 will not strike anything upon opening. The range reduction may, for example, be achieved by reducing the sensitivity of the receiver 40 when the ranging sensors 32 detect an obstruction within the liftgate 14 overhang distance.

The controller 48 may also be operative to energize the ranging sensors 32 throughout the opening cycle and/or the closing cycle of the liftgate 14, and arrest powered movement of the liftgate 14 at any time an obstruction is detected within the overhang distance. In this way, the system is able to prevent the liftgate 14 from contacting an obstruction that does not come within the overhang distance after the motor 22 has begun to run.

The controller 48 is preferably operative to allow the remote control operator to override the motor inhibit feature (after visually inspecting the area behind the vehicle to ensure that the liftgate 14 will not strike the obstruction 52) by actuating the transmitter unit 38 in the proper manner. For example, depressing the button 50 a second time within a certain time period after the warning signal may serve to energize the liftgate motor 22 regardless of a detected obstruction. Alternatively, the system may be designed to override the inhibit function if the operator presses and holds the button 50 for a certain length of time, or a separate "override" button 53 may be provided on the transmitter unit 38.

While the preceding description focuses on the case where the liftgate 14 is initially closed and is moving to the open position, the invention system may also operate to detect obstructions prior to closing of the liftgate 14. This may be achieved by programming the controller 48 to activate the ranging sensors 32 when the liftgate 14 is open and the transmitter unit 38 is actuated to close the liftgate 14. This may prevent or lessen the likelihood that the liftgate 14 will close and strike an obstruction that has moved beneath the overhang of the liftgate 14 after it has opened.

The invention system may also be operative to inhibit powered opening and/or closing of the liftgate 14 when commanded by an interior OPEN/CLOSE switch 44 located in the passenger compartment.

It may be desirable to provide ranging sensors 32 mounted on the vehicle at varying heights. Because the maximum overhang distance for the liftgate 14 occurs when the liftgate is generally horizontal and extends away from the vehicle adjacent its roof line, ranging sensors 32 mounted on the bumper may fail to detect an overhanging obstruction 52 that is not within $D_O$ at bumper height, but is within $D_O$ higher off the ground where the liftgate 14 would strike it. The controller 48 may be operative to establish different clearance distances for ranging sensors 32 located at different heights, this allowing the system to account for the fact that the overhang distance increases as the liftgate 14 swings outward and upward to the open position.

The invention system is compatible with a vehicle that is also fitted with a rear obstruction detection system, also known as a backup aid, intended to give the driver of the vehicle an audible warning when the vehicle's transmission is in reverse and rear-mounted ranging sensors detect objects behind the vehicle. According to a known backup aid system, four ultrasonic ranging sensors are located at spaced locations along the rear bumper of the vehicle and the system provides an audible warning when it detects an object within six feet or less of the rear of the bumper. The ranging sensors 32 utilized in the present invention may also be used for the backup aid system, the controller 48 being operative to activate the backup aid system when the transmission gear selector 54 (see FIG. 3) is placed in reverse. This causes the ranging sensors 32 to transmit ultrasonic signals, receive the signals reflected back from an obstruction 52, and sound the interior warning device 42 to alert the driver if the obstruction is within a prescribed distance of the vehicle.

Various other modifications and variations will no doubt occur to those skilled in the arts to which this invention pertains. Such variations and modifications, which generally rely on the teachings through which this disclosure has advanced the art, are properly considered within the scope of this invention. This disclosure should thus be considered illustrative, not limiting; the scope of the invention is instead defined by the following claims.

What is claimed is:

1. A powered liftgate actuation system for an automotive vehicle having a liftgate attached to a rear of the vehicle by a hinge and swinging outwardly and upwardly between a closed position and an open position, the liftgate projecting beyond a rearmost portion of the vehicle by an overhang distance during transit between the closed and open positions, the actuation system comprising:

a motor actuatable to move the liftgate from the closed position to the open position and from the open position to the closed position;

a wireless remote control transmitter activatable to transmit a signal;

a receiver for receiving the signal;

a non-contact ranging sensor mounted to the vehicle and directed rearward to measure a clearance distance between the vehicle and an obstruction; and a control module operable to actuate the motor upon receipt of the signal from the remote control transmitter, and further operable to inhibit actuation of the motor by the remote control transmitter if the ranging sensor indicates that the clearance distance is less than the overhang distance.

2. The liftgate actuation system according to claim 1 wherein the control module is further operable to activate a warning when the transmitter is activated if the ranging sensor indicates the clearance distance is less than the overhang distance.

3. The liftgate actuation system according to claim 1 wherein the control module has an override feature allowing the transmitter to actuate the motor in spite of the ranging sensor indicating that the clearance distance is less than the overhang distance.

4. The liftgate actuation system according to claim 3 wherein the override feature is achieved by holding a button on the transmitter in a depressed condition for longer than a predetermined override time period.

5. The liftgate actuation system according to claim 3 wherein the override feature is achieved by making a second actuation of a button on the transmitter.

6. The liftgate actuation system according to claim 1 wherein said inhibition of the motor is achieved by reducing the range at which the transmitter is effective to actuate the motor.

7. The liftgate actuation system according to claim 6 wherein said range reduction is achieved by reducing the sensitivity of the receiver when the clearance distance is less than the overhang distance.

8. The liftgate actuation system according to claim 1 wherein the ranging sensor is an ultrasonic sensor.

9. The liftgate actuation system according to claim 1 wherein the ranging sensor provides an input to a backup aid sensing system.

10. The liftgate actuation system according to claim 1 wherein the ranging sensor is mounted on the liftgate.

11. The liftgate actuation system according to claim 1 wherein the ranging sensor is active throughout movement of the liftgate between the open and closed positions.

12. The liftgate actuation system according to claim 1 wherein the ranging sensor is mounted adjacent an upper end of the liftgate.

13. A powered liftgate actuation system for an automotive vehicle having a liftgate attached to a rear of the vehicle by a hinge and swinging outwardly and upwardly between a closed position and an open position, the liftgate projecting beyond a rearmost portion of the vehicle by an overhang distance during transit between the closed and open positions, the actuation system comprising a motor actuatable to move the liftgate from the closed position to the open position and from the open position to the closed position, a wireless remote control transmitter activatable to transmit a signal, a receiver for receiving the signal, and a control module operable to actuate the motor upon receipt of the signal from the transmitter, the system characterized in that:

a non-contact ranging sensor is mounted to the vehicle and directed rearward to measure a clearance distance between the vehicle and an obstruction; and the control module is further operable to inhibit actuation of the motor by the transmitter if the ranging sensor indicates that the clearance distance is less than the overhang distance.

14. The liftgate actuation system according to claim 13 wherein the control module is further operable to activate a warning when the transmitter is activated if the ranging sensor indicates the clearance distance is less than the overhang distance.

15. The liftgate actuation system according to claim 13 wherein the control module has an override feature allowing the transmitter to actuate the motor in spite of the ranging sensor indicating that the clearance distance is less than the overhang distance.

16. The liftgate actuation system according to claim 13 wherein the ranging sensor is an ultrasonic sensor.

17. The liftgate actuation system according to claim 13 wherein the ranging sensor provides an input to a backup aid sensing system.

18. The liftgate actuation system according to claim 13 wherein the ranging sensor is mounted on the liftgate.

19. The liftgate actuation system according to claim 13 wherein the ranging sensor is active throughout an opening cycle.

20. The liftgate actuation system according to claim 13 wherein the ranging sensor is mounted adjacent an upper end of the liftgate.

21. A method of operating a remotely controllable powered liftgate actuation system of an automotive vehicle having a liftgate movable between a closed position and an open position, the actuation system comprising a motor actuatable to move the liftgate from the closed position to the open position, and a wireless remote control transmitter activatable to transmit a signal that instructs actuation of the motor, the method comprising the steps of:

in response to activation of the remote control transmitter, energizing a non-contact ranging sensor mounted to the vehicle and directed rearward to measure a clearance distance between the vehicle and an obstruction; and inhibiting actuation of the motor by the remote control transmitter if the ranging sensor indicates that the clearance distance is less than an overhang distance by which the liftgate projects beyond a rearmost portion of the vehicle during transit between the closed and open positions.

* * * * *